United States Patent [19]

Hickmann et al.

[11] Patent Number: 5,130,454

[45] Date of Patent: Jul. 14, 1992

[54] POLYTETRAHYDROFURAN DERIVATIVES HAVING TERMINAL AROMATIC GROUPS

[75] Inventors: Eckhard Hickmann, Dannstadt-Schauernheim; Ulrich Koehler, Heidelberg; Hardo Siegel, Speyer, all of Fed. Rep. of Germany

[73] Assignee: BASF Aktiengesellschaft, Ludwigshafen, Fed. Rep. of Germany

[21] Appl. No.: 630,013

[22] Filed: Dec. 19, 1990

[30] Foreign Application Priority Data

Dec. 22, 1989 [DE] Fed. Rep. of Germany ....... 3942574

[51] Int. Cl.$^5$ ............................................ C07C 69/96
[52] U.S. Cl. ................................... 558/268; 558/269;
558/271; 558/272; 558/413; 558/415; 558/416;
558/417; 558/418; 558/419; 558/420; 558/421;
558/422; 558/423; 558/424; 560/8; 560/14;
560/21; 560/25; 560/22; 560/42; 560/45;
560/46; 560/53; 560/64; 560/65; 560/67;
560/70; 560/76; 560/83; 560/301; 560/358;
560/359; 560/360; 562/46; 562/47; 562/58;
562/66; 562/67; 562/73; 562/76; 562/840;
562/853; 564/157; 564/158; 564/221; 564/384;
564/388; 564/389; 564/441; 564/442
[58] Field of Search ........................ 568/331, 442, 609;
564/157, 158, 221, 384, 388, 389, 441, 442, 443;
562/46, 47, 58, 66, 67, 73, 76, 840, 853; 560/8,
14, 21, 25, 27, 42, 45, 46, 53, 64, 65, 67, 70, 76,
83, 301, 358, 359, 360; 558/268, 269, 271, 272,
413, 415, 416, 417, 418, 419, 420, 421, 422, 423,
424

[56] References Cited

U.S. PATENT DOCUMENTS 4,515,981 5/1985 Otani et al. .
4,847,416 7/1989 Durvasula et al. .

FOREIGN PATENT DOCUMENTS 0288825 11/1988 European Pat. Off. .
2118184 10/1983 United Kingdom .

OTHER PUBLICATIONS

Smith, et al., "New Aspects of the Chemistry of Lining Tetrahydrofuran Polymers Initiated by Trifluoromethane Sulfonic Amlydride," *ACS Symp. Ser.* 59 (Ring-Opening Polymer, Int. Symp.), 13–23 (1977).
P. Dreyfus, Handbook of Elastomers, New Developments and Technology, (1988), pp. 695–708.

*Primary Examiner*—Bruce Gray
*Attorney, Agent, or Firm*—John H. Shurtleff

[57] ABSTRACT

Polytetrahydrofuran derivatives of the general formula

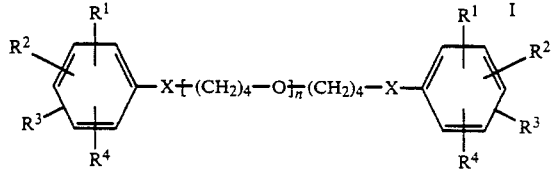

where n is from 2 to 70, X is the bridge member —NH— or —O— and $R^1$ and $R^4$ are each hydrogen or various radicals.

1 Claim, No Drawings

POLYTETRAHYDROFURAN DERIVATIVES HAVING TERMINAL AROMATIC GROUPS

The present invention relates to novel polytetrahydrofuran derivatives having terminal aromatic groups.

The novel polytetrahydrofuran derivatives are of the general formula

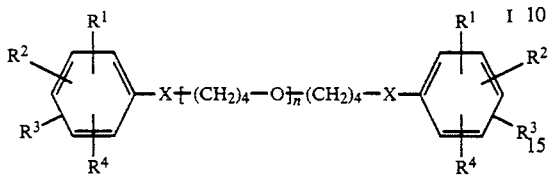

where n is from 2 to 70, X is the bridge member —NH— or —O—, $R^1$ is hydrogen, alkyl of 1 to 20 carbon atoms, an $H_2N$—, $O_2N$—, OHC—NH—, HO—, OHC—, NC—, $HOCH_2$—, $H_2NCH_2$—, $ClH_2C$—, $FH_2C$—, $Cl_3C$—, $F_3C$—, $HO_3S$—, ClOC—, OCN— or NCO— radical or one of the radicals $R^5$—NH—, $R^5R^6N$—, $R^5O$—CO—, $R^5CO$—, $R^5O$—, $R^5CO$—NH—, $R^5OOC$—NH— or $R^5OOC$—O—, in which $R^5$ and $R^6$ are each alkyl of 1 to 10 carbon atoms, $R^2$ and $R^3$ are each hydrogen, alkyl of 1 to 10 carbon atoms, an $H_2N$—, $O_2N$—, OHC—NH—, HO—, OHC—, NC— or $HOCH_2$— radical or one of the radicals $R^5$—NH— or $R^5R^6$—N—, in which $R^5$ and $R^6$ are as described above, and $R^4$ is hydrogen, alkyl of 1 to 4 carbon atoms or an $H_2N$—, $O_2N$— or HO— radical.

Polytetrahydrofurans (referred to below as PTHF) are of the general formula $$H \text{—} [O \text{—} (CH_2)_4]_m \text{—} OH \qquad II$$

where m=n+1. They are prepared, for example, by cationic polymerization of tetrahydrofuran (referred to below as THF). In formula II, the degree of polymerization m indicates the number of oxybutane-1,4-diyl units per molecule which are derived from THF; m is usually from 3 (corresponding to a mean molecular weight MW of 234) to about 70 (corresponding to a mean MW of about 5,000). The degree of polymerization m or the mean molecular weight (referred to below as $\overline{MW}$) corresponding to this value which characterizes the PTHF mixtures obtainable in the polymerization of THF, can be determined, for example, by osmometric or titrimetric analysis. Of particular industrial interest are, for example, the following PTHF mixtures: PTHF 250 ($\overline{MW}$=about 250, m=about 3), PTHF 650 ($\overline{MW}$=about 650, m =about 9), PTHF 1000 ($\overline{MW}$=about 1,000, m=about 14), PTHF 2000 ($\overline{MW}$=about 2,000, m=about 27), PTHF 2900 ($\overline{MW}$=about 2,900, m=about 40) and PTHF 4500 ($\overline{MW}$=about 4,500, m=about 62).

Each of these PTHF mixtures contains a broad spectrum of PTHF homologs, the number of which is about 10-20 in the low molecular weight range and increases to over 30 in the high molecular weight range.

PTHF is an α,ω-diol and is used for the preparation of polymers. Because of its valuable properties, it is a building block for elastomeric and thermoplastic polymers (P. Dreyfuss, Handbook of Elastomers, New Developments and Technology, 1988, page 695).

The reactivity of PTHF as an α,ω-diol is however limited to the typical reactions of primary alcohols. There has therefore been no lack of attempts to impart different reactivity to PTHF by modifying the terminal groups, in order to extend its potential uses. For example, the reaction of PTHF with diisocyanates in a molar ratio of 1:2 gives PTHF diurethanes having free terminal isocyanate groups, and transesterification of (meth)acrylates with PTHF gives PTHF bis(meth)acrylates. Such reactions with mixtures of PTHF homologs in turn give mixtures of homologous PTHF derivatives which differ structurally likewise only in the different number of repeating oxybutane-1,4-diyl units in the polyether chain.

The present invention relates to the novel PTHF derivatives of the formula I. These novel compounds are useful intermediates for the preparation of polymeric esters, amides, urethanes, ureas, adhesives and binders.

Suitable alkyl radicals $R^1$ are those of 1 to 20 carbon atoms, and suitable alkyl radicals $R^2$, $R^3$, $R^5$ and $R^6$ are those of 1 to 10 carbon atoms. The alkyl radicals may be straight-chain or branched. Examples of alkyl radicals are the following: methyl, etyl, propyl, isopropyl, butyl, isobutyl, tert-butyl, pentyl, hexyl and nonyl.

The preferred alkyl radicals $R^1$ are of 1 to 10 carbon atoms and the preferred alkyl radicals $R^2$, $R^3$, $R^5$ and $R^6$ are of 1 to 6, in particular 1 to 4, carbon atoms.

PTHF derivatives of the formula I are, for example, the following compounds, in which

is the bridge member —[(CH_2)_4—O]_n(CH_2)_4—:

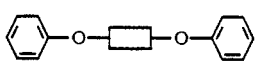

1.

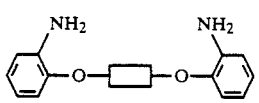

2.

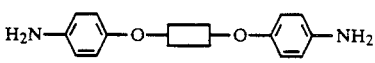

3.

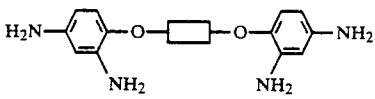

4.

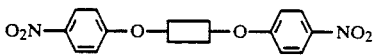

5.

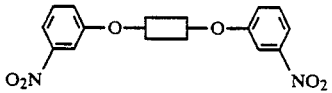

6.

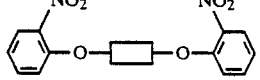

7.

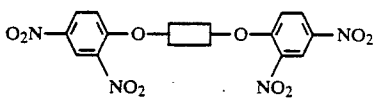

8.

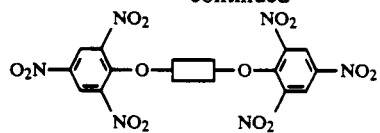 9.
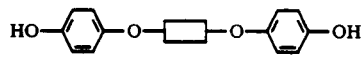 10.
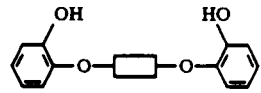 11.
 12.
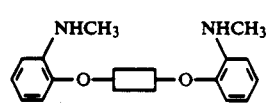 13.
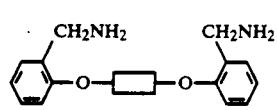 14.
 15.
 16.
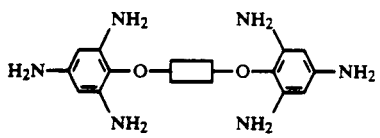 17.
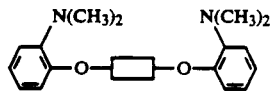 18.
 19.
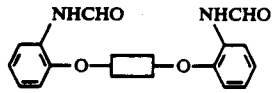 20.
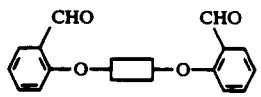 21.
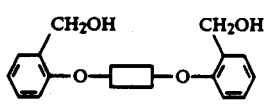 22.
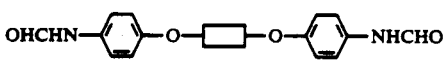 23.
 24.
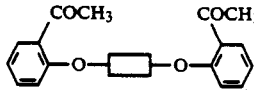 25.
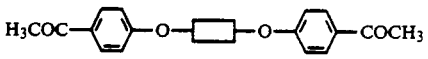 26.
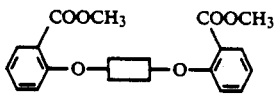 27.
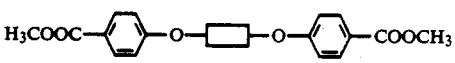 28.
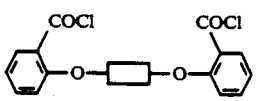 29.
 30.
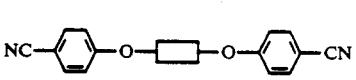 31.
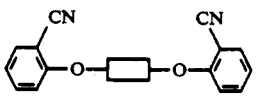 32.
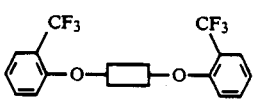 33.
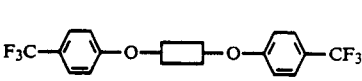 34.
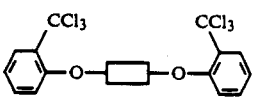 35.
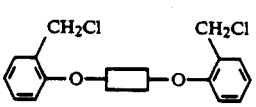 36.
 37.
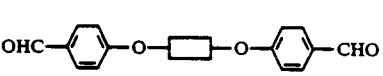 38.
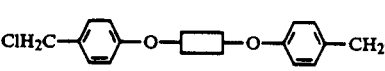 39.
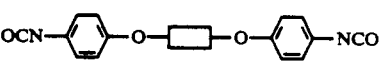 40.
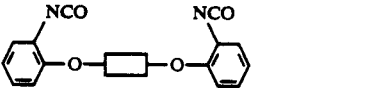 41.
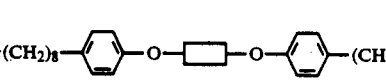 42.

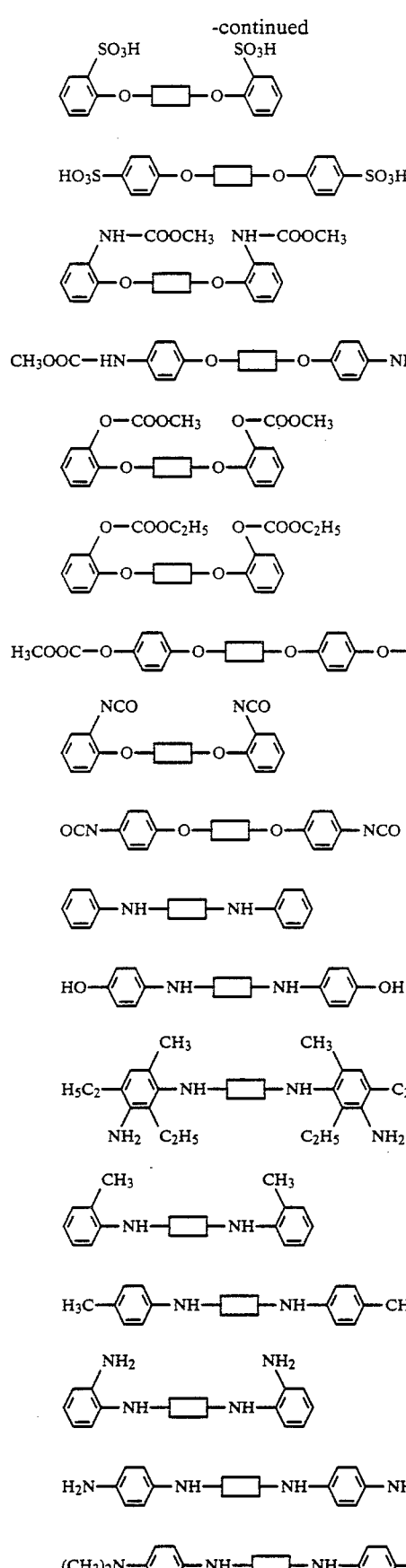
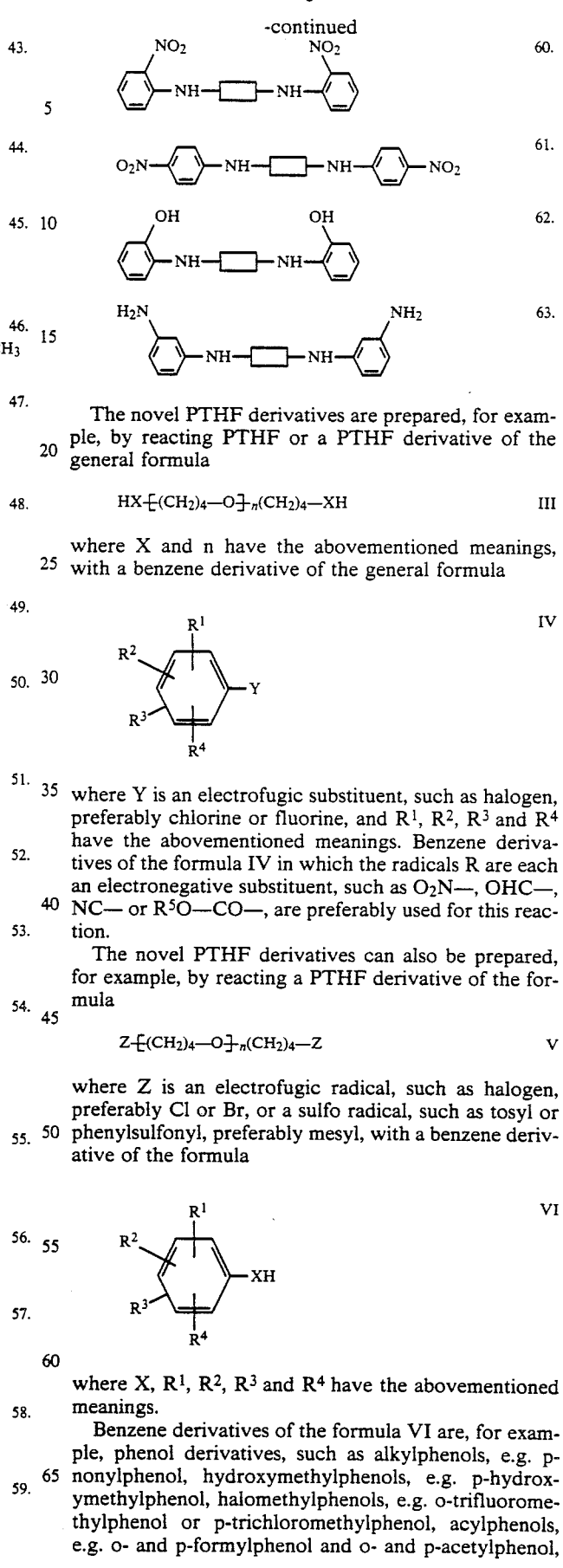

The novel PTHF derivatives are prepared, for example, by reacting PTHF or a PTHF derivative of the general formula $$HX-[(CH_2)_4-O]_n-(CH_2)_4-XH \qquad III$$

where X and n have the abovementioned meanings, with a benzene derivative of the general formula $$\underset{R^3}{\overset{R^1}{\underset{R^4}{R^2-\text{C}_6\text{H}_2}}}-Y \qquad IV$$

where Y is an electrofugic substituent, such as halogen, preferably chlorine or fluorine, and $R^1$, $R^2$, $R^3$ and $R^4$ have the abovementioned meanings. Benzene derivatives of the formula IV in which the radicals R are each an electronegative substituent, such as $O_2N-$, OHC—, NC— or $R^5O-CO-$, are preferably used for this reaction.

The novel PTHF derivatives can also be prepared, for example, by reacting a PTHF derivative of the formula $$Z-[(CH_2)_4-O]_n-(CH_2)_4-Z \qquad V$$

where Z is an electrofugic radical, such as halogen, preferably Cl or Br, or a sulfo radical, such as tosyl or phenylsulfonyl, preferably mesyl, with a benzene derivative of the formula $$\underset{R^3}{\overset{R^1}{\underset{R^4}{R^2-\text{C}_6\text{H}_2}}}-XH \qquad VI$$

where X, $R^1$, $R^2$, $R^3$ and $R^4$ have the abovementioned meanings.

Benzene derivatives of the formula VI are, for example, phenol derivatives, such as alkylphenols, e.g. p-nonylphenol, hydroxymethylphenols, e.g. p-hydroxymethylphenol, halomethylphenols, e.g. o-trifluoromethylphenol or p-trichloromethylphenol, acylphenols, e.g. o- and p-formylphenol and o- and p-acetylphenol, alkoxycarbonylphenols, e.g. o- and p-methoxycarbonylphenol, cyanophenols, e.g. o- and p-cyanophenol, aminophenols, e.g. p-aminophenol, N-acylaminophenols, e.g. p-N-formylaminophenol, polyhydric phenols, e.g. pyrocatechol, resorcinol and hydroquinone, nitrophenols, e.g. o-, m- and p-nitrophenol and 2,4-dinitrophenol, and sulfo-substituted phenols, e.g. o- and p-hydroxybenzenesulfonic acid. Other compounds of the formula VI are, for example, aniline and aniline derivatives, such as alkylanilines, e.g. o-, m- and p-toluidine and 2,6-dimethylaniline, and polyvalent aminobenzenes, e.g. o-, m- and p-phenylenediamine and 2,4-diethyl-6-methyl-1,3-phenylenediamine, and hydroxyaminophenols, e.g. p-hydroxyaniline.

PTHF derivatives of the formula I can also be prepared, for example, by hydrogenating PTHF derivatives of the formula I whose benzene ring contains reducible substituents, such as acyl, ester, nitrile or, in particular, nitro groups, these groups being converted into hydroxyalkyl, hydroxymethyl, aminomethyl and amino groups. PTHF derivatives of the formula I having nitro groups are particularly suitable for this purpose.

In the Examples which follow, all the novel polytetrahydrofuran derivatives were characterized by NMR spectroscopy using tetramethylsilane as an internal standard; the chemical shifts are stated in ppm. The abbreviations have the following meanings: s=singlet, d=doublet, t=triplet and m=multiplet. The average molecular weights $\overline{MW}$ were derived from the intensity ratios of characteristic NMR bands or determined by osmometry.

EXAMPLE 1

Preparation of PTHF having p-nitrophenoxy groups (compound no. 5)

A mixture of 16.3 g of PTHF 650, 3.8 g of finely powdered, dry potassium carbonate, 10.6 g of p-nitrofluorobenzene and 0.2 g of tetramethylammonium chloride is heated at 180° C. for 24 hours, after which the excess p-nitrofluorobenzene is distilled off at 0.5 mbar and 48° C. The residue is extracted with 100 ml of methyl tert-butyl ether, after which the solution is filtered, the solvent is stripped off and the residue is dried under reduced pressure from an oil pump. 22.0 g of compound no. 5 where n is 8 are obtained as a brown, viscous oil.

NMR (CDCl$_3$): $\delta$=1.4–2.0 (m); 3.2–3.5 (m); 4.1 (t); 6.95 and 8.2 (d, d)

$\overline{MW}$ (determined by osmometry in chloroform): 750

EXAMPLE 2

Preparation of PTHF having 2,4-dinitrophenoxy groups (compound no. 8)

32.5 g of PTHF 650 are reacted with 7.6 g of potassium carbonate and 27.9 g of 2,4-dinitrofluorobenzene, similarly to Example 1. After the mixture has been worked up in the same manner, 41.7 g of compound no. 8 where n is 8 are obtained as a brown, viscous oil.

NMR (CDCl$_3$): $\delta$=1.4–2.0 (m); 3.2–3.6 (m); 4.3 (t); 7.25 and 8.4 (d, d); 8.75 (s)

$\overline{MW}$ (determined by osmometry in acetone): 890

EXAMPLE 3

Preparation of PTHF having p-formylphenoxy groups (compound no. 38)

156 g of PTHF 250 dimesylate are added dropwise to a mixture of 158 g of the sodium salt of p-hydroxybenzaldehyde (about 87% strength) and 2 l of dimethylformamide at 60°–67° C. in the course of 3 hours, while stirring. The reaction mixture is stirred for a further 8 hours at 60° C., after which 3 l of water are added and the mixture is extracted with twice 1 l of methyl tertbutyl ether. The combined organic solutions are washed with three times 0.5 l of water and evaporated down. The residue is dried under reduced pressure from an oil pump. 160 g of compound no. 38 where n is 2 are obtained as a viscous oil.

NMR (CDCl$_3$): $\delta$=1.5–2.0 (m); 3.3–3.6 (m); 4.05 (t); 6.95 and 7.8 (d, d); 9.0 (s)

$\overline{MW}$ (NMR): 479

EXAMPLE 4

Preparation of PTHF having p-acetylphenoxy groups (compound no. 26)

137 g of the sodium salt of p-acetylphenol (97%) in 2 l of dimethylformamide are reacted with 366 g of PTHF 1000 dimesylate at 65°–70° C., similarly to Example 3. After the mixture has been worked up in the same manner, 370 g of compound no. 26 where n is 13 are obtained as a viscous oil.

NMR (CDCl$_3$): $\delta$=1.5–2.0 (m); 2.55 (s); 3.3–3.6 (m); 4.0 (t); 7.0 and 8.0 (d, d)

$\overline{MW}$ (determined by osmometry in acetone): 1252

EXAMPLE 5

Preparation of PTHF having p-methoxycarbonylphenoxy groups (compound no. 28)

94.4 g of methyl p-hydroxybenzoate are dissolved in 600 ml of methanol, 111.6 g of 30% strength methanolic sodium methylate solution and 564 g of a 48% strength solution of PTHF 1000 dimesylate in toluene are added and the reaction mixture is stirred for 24 hours at 60° C. The solvent is then stripped off, the residue is partitioned between 300 ml of water and 800 ml of methyl tert-butyl ether, the organic phase is washed with 500 ml of water, the solvent is distilled off and the residue is dried under reduced pressure from an oil pump. 279 g of compound no. 28 where n is 13 are obtained.

NMR (CDCl$_3$): $\delta$=1.5–1.95 (m); 3.3–3.55 (m); 3.85 (s); 4.0 (t); 6.9 and 8.0 (d, d)

$\overline{MW}$ (NMR): 1056

EXAMPLE 6

Preparation of PTHF having p-cyanophenoxy groups (compound no. 31)

A solution of 25 g of p-cyanophenol and 10.8 g of sodium methylate in 230 ml of methanol is initially taken and 262.8 g of a 44% strength solution of PTHF 1000 dimesylate in toluene are added dropwise in the course of 4.5 hours at a reaction temperature of 60° C., while stirring. Stirring is continued for a further 6 hours at 60° C., 1 l of water is added, the organic phase is separated off and washed twice with 250 ml of 10% strength aqueous sodium carbonate solution, the solvent is stripped off and the residue is dried under reduced pressure from an oil pump. 107.2 g (compound no. 31) where n is 13 are obtained.

NMR (CDCl$_3$): $\delta$=1.45–1.95 (m); 3.2–3.5 (m); 4.05 (t); 6.9 and 7.6 (d, d)

$\overline{MW}$ (NMR): 1450

EXAMPLE 7

Preparation of PTHF having p-aminophenoxy groups (compound no. 3)

The salt of 3.4 g of about 80% strength sodium hydride with 12 g of p-aminophenol in 150 ml of N-methylpyrrolidone is reacted, under nitrogen, with a solution of 39 g of PTHF 650 dimesylate in 40 ml of N-methylpyrrolidone, similarly to Example 8. After the mixture has been worked up in the same manner, 36 g of compound no. 3 where n is 8 are obtained as a dark, viscous oil.

NMR (CDCl$_3$): $\delta$ = 1.4–1.8 (m); 3.2–3.4 (m); 3.9 (t); 6.6 and 6.75 (d, d)

$\overline{MW}$ (determined by osmometry in chloroform): 840

EXAMPLE 8

Preparation of PTHF having o-nitrophenoxy groups (compound no. 7)

3.5 g of 80% strength sodium hydride in 70 ml of N-methylpyrrolidone are initially taken under nitrogen, 15.3 g of o-nitrophenol are added at 25°–35° C. in the course of about 45 minutes, the mixture is then heated to 100° C. and a solution of 57.8 g of PTHF 1000 dimesylate in 50 ml of N-methylpyrrolidone is added dropwise in the course of 1 hour. The mixture is stirred for 4 hours at 100° C., after which the solvent is stripped off at 1 mbar and at a bath temperature of 100° C., the residue is partitioned between 400 ml of 10% strength aqueous sodium carbonate solution and 300 ml of methyl tert-butyl ether, the organic phase is washed with 200 ml of 10% strength aqueous sodium carbonate solution, the solvent is distilled off and the residue is dried under reduced pressure from an oil pump. 50 g of compound no. 7 where n is 13 are obtained.

NMR (CDCl$_3$): $\delta$ = 1.4–2.0 (m); 3.2–3.5 (m); 4.15 (t); 7.0; 7.05; 7.5 and 7.8 (m, m, m, m)

$\overline{MW}$ (NMR): 1100

EXAMPLE 9

Preparation of PTHF having m-nitrophenoxy groups (compound no. 6)

15.3 g of m-nitrophenol are reacted instead of o-nitrophenol, similarly to Example 8. 48 g of compound no. 6 where n is 13 are obtained.

NMR (CDCl$_3$): $\delta$ = 1.4–2.0 (m); 3.2–3.5 (m); 4.05 (t); 7.2; 7.4 and 7.8 (m, m, m); 7.7 (s) $\overline{MW}$ (NMR): 1170

EXAMPLE 10

Preparation of PTHF having p-nitrophenoxy groups (compound no. 5)

3.5 g of 80% strength sodium hydride in 70 ml of N-methylpyrrolidone are initially taken under dry nitrogen, and a solution of 15.3 g of p-nitrophenol in 80 ml of N-methylpyrrolidone is added dropwise at 25°–40° C. in the course of about 45 minutes, while stirring. The solution is heated to 140° C., a solution of 57.8 g of PTHF 1000 dimesylate in 50 ml of N-methylpyrrolidone is added dropwise in the course of 1 hour, the reaction mixture is stirred for a further 4 hours at 140° C. and the solvent is stripped off at 1 mbar and at a bath temperature of 100° C. The residue is partitioned between 400 ml of a 10% strength aqueous sodium carbonate solution and 300 ml of methyl tert-butyl ether, the organic phase is washed with 200 ml of 10% strength aqueous sodium carbonate solution, the solvent is stripped off and the residue is dried under reduced pressure from an oil pump. 51.3 g of compound no. 5 where n is 13 are obtained as a yellow, viscous oil.

NMR (CDCl$_3$): $\delta$ = 1.4–2.0 (m); 3.2–3.5 (m); 4.1 (t); 6.95 and 8.2 (d, d)

$\overline{MW}$ (determined by osmometry in acetone): 1160

EXAMPLE 11

Preparation of PTHF having 2,4-dinitrophenoxy groups (compound no. 8)

Water-moist 2,4-dinitrophenol is first dried by azeotropic dehydration with toluene, after which 150 ml of N-methylpyrrolidone are added to a suspension of 18.5 g of 2,4-dinitrophenol in about 100 ml of toluene and the toluene is distilled off under atmospheric pressure. 7.6 g of anhydrous potassium carbonate and 28.9 g of PTHF 1000 dimesylate are added, after which the mixture is heated at a reaction temperature of 130° C. for 5 hours under nitrogen and while stirring, the solvent is stripped off at 5 mbar and at a bath temperature of 100° C., the residue is partitioned between 300 ml of 10% strength aqueous potassium carbonate solution and 300 ml of methyl tert-butyl ether, the organic phase is washed with 200 ml of 10% strength aqueous potassium carbonate solution, the solvent is stripped off and the residue is dried under reduced pressure from an oil pump. 20 g of compound no. 8 (n TM 13) are obtained as a dark oil.

NMR: as described for Example 2

$\overline{MW}$ (determined by osmometry in acetone): 1302

EXAMPLE 12

Preparation of PTHF having p-hydroxyphenoxy groups (compound no. 10)

The salt of 8.3 g of about 80% strength sodium hydride and 27.5 g of hydroquinone in 400 ml of N-methylpyrrolidone is reacted with a solution of 28.9 g of PTHF 1000 dimesylate under nitrogen, similarly to Example 8. The reaction mixture is cooled, after which 12 g of glacial acetic acid are added, the solvent is stripped off at 5 mbar and at a bath temperature of 100° C., the residue is partitioned between 500 ml of 10% strength aqueous sodium carbonate solution and 400 ml of methyl tert-butyl ether, the aqueous phase is extracted with twice 100 ml of methyl tert-butyl ether, the combined organic solutions are washed with 150 ml of 10% strength aqueous sodium bicarbonate solution, the solvent is stripped off and excess hydroquinone is removed by sublimation at 0.2 mbar and at a bath temperature of 140°–155° C. 22.3 g of compound no. 10 (n = 13) are obtained as a dark, viscous oil.

NMR (D$_6$-DMSO): $\delta$ = 1.4–1.8 (m); 3.25 (s); 3.35 (m); 3.85 (t); 6.65 and 6.75 (d, d)

$\overline{MW}$ (determined by osmometry in acetone): 1306

EXAMPLE 13

Preparation of PTHF having p-sulfophenoxy groups (compound no. 44)

143.8 g of the disodium salt of p-hydroxyphenylsulfonic acid (about 90% strength) are suspended in 1 l of N-methylpyrrolidone under nitrogen, 208.1 g of PTHF 1000 dimesylate are added dropwise at a reaction temperature of 100° C. while stirring, and the reaction mixture is stirred for a further 4 hours at 100° C. and for another hour at 120° C. The solvent is stripped off at 5 mbar and at a bath temperature of 100° C., after which the residue is partitioned between 500 ml of 2 N hydrochloric acid and 500 ml of methylene chloride, the organic phase is shaken once with 300 ml of 2 N hydrochloric acid, the solvent is stripped off and the residue is dried under reduced pressure from an oil pump. 179 g of compound no. 44 where n is 13 are obtained.

NMR (D$_6$-DMSO): $\delta$ = 1.4–1.8 (m); 3.2–3.5 (m); 4.0 (t); 6.85 and 7.5 (d, d); 8.1 (m)

$\overline{MW}$ (calculated from acid number): 1403

EXAMPLE 14

Preparation of PTHF having phenylamino groups (compound no. 52)

1,058 g of aniline are initially taken, and 231 g of PTHF 250 dimesylate are added dropwise in the course of 1 hour at 70° C., while stirring. Stirring is continued for another 4 hours and the excess aniline is distilled off at 55° C./0.5 mbar. The residue is partitioned between 700 ml of 2 N sodium hydroxide solution and 500 ml of methyl tert-butyl ether, and the organic phase is dried and evaporated down. 189 g of the compound of the formula 52 (n=2) are obtained as a yellow oil.

NMR (CDCl$_3$): $\delta$=1.4–1.8 (m); 3.15 (t); 3.3–3.5 (m); 3.65 (broad m); 6.5–6.8 (m); 7.1–7.3 (m)

$\overline{MW}$ (NMR): 420

EXAMPLE 15

Preparation of PTHF having p-aminophenylamino groups (compound no. 58)

10.8 g of p-phenylenediamine are dissolved in 200 ml of methanol under nitrogen at 30°–40° C., 11.6 g of PTHF 1000 dimesylate are added dropwise in the course of about 30 minutes while stirring and the reaction mixture is stirred for a further 3 hours at room temperature. The solvent is stripped off, after which the excess p-phenylenediamine is removed at 180°–220° C. and 3 mbar in a short-path distillation apparatus. The residue is suspended in 80 ml of 2 N sodium hydroxide solution and extracted with three times 100 ml of methyl tert-butyl ether. The combined organic solution is washed with 50 ml of water, after which the solvent is stripped off and the residue is dried under reduced pressure from an oil pump. 10.3 g of compound no. 58 where n is 13 are obtained.

NMR (CDCl$_3$): $\delta$=1.4–1.8 (m); 3.1 (t); 3.2–3.4 (m); 6.55 and 6.6 (d, d)

$\overline{MW}$ (determined by osmometry in chloroform): 1200

EXAMPLE 16

Preparation of PTHF having 3-amino-2,4-diethyl-6-methylphenylamino groups (compound no. 54)

963 g of 3,5-diethyl-2,4-diaminotoluene are initially taken and 122 g of PTHF 250 dimesylate are added dropwise in the course of 1 hour at 70° C., while stirring. Stirring is continued for a further 4 hours and the excess amine is distilled off at 133° C./2 mbar. The residue is partitioned between 400 ml of toluene and 500 ml of 2 N sodium hydroxide solution. The toluene phase is extracted once by shaking with 400 ml of saturated sodium chloride solution and is dried and evaporated down. 134.6 g of compound no. 54 where n is 2 are obtained as a yellow oil.

NMR (CDCl$_3$): $\delta$=1.1–1.3 (m); 1.5–1.7 (m); 2.0–2.3 (m); 2.4–2.8 (m); 2.9 (t); 3.2–3.6 (m); 6.75 (s)

$\overline{MW}$ (NMR): 570

EXAMPLE 17

Preparation of PTHF having p-hydroxyphenylamino groups (compound no. 53)

21.8 g of p-aminophenol in 200 ml of N-methylpyrrolidone are initially taken, 23.1 g of PTHF 1000 dimesylate are added dropwise in the course of 1 hour at 50° C. while stirring, and the reaction mixture is stirred for a further 3 hours. The solvent is distilled off at 5 mbar and at a bath temperature of 100° C., after which the major part of the excess p-aminophenol is removed by sublimation at 2 mbar and at a bath temperature of 160° C., the residue is partitioned between 150 ml of 10% strength aqueous sodium bicarbonate solution and 150 ml of methylene chloride, the organic phase is washed with 100 ml of 10% strength aqueous sodium bicarbonate solution, the solvent is stripped off and the residue is dried under reduced pressure from an oil pump.

15.5 g of compound no. 53 where n is 13 are obtained as a dark, viscous oil.

NMR (CDCl$_3$): $\delta$=1.4–1.7 (m); 3.1 (t); 3.2–3.5 (m); 6.4 (broad m); 6.55 and 6.7 (d, d)

$\overline{MW}$ (determined by osmometry in chloroform): 1300

EXAMPLE 18

Preparation of PTHF having p-aminophenoxy groups (compound no. 3)

A mixture of 62.1 g of compound no. 5 (MW=1200), 150 ml of THF and 5 g of Raney nickel is heated with thorough mixing in a 300 ml autoclave at a hydrogen pressure of 50 bar for 2 hours at 75° C. and for a further hour at 100° C. Thereafter, the mixture is cooled, the pressure is let down, filtration is carried out and the low boilers are stripped off under reduced pressure. 56.0 g of compound no. 3 where n is 13 are obtained as a viscous, brown oil.

NMR as described under Example 7

$\overline{MW}$ (determined by osmometry in chloroform): 1200

EXAMPLE 19

Preparation of PTHF having 2,4-diaminophenoxy groups (compound no. 4)

19.6 g of compound no. 8 ($\overline{MW}$=1300) in 100 ml of THF are hydrogenated over 2 g of Raney nickel similarly to Example 18. Working up in the same manner gives 17.2 g of compound no. 4 where n is 13 as a viscous, brown oil.

NMR (CDCl$_3$): $\delta$=1.4–2.0 (m); 3.2–3.6 (m); 3.9 (t); 6.0 and 6.6 (d, d); 6.1 (s)

$\overline{MW}$ (determined by osmometry in chloroform): 1300

EXAMPLE 20

Preparation of PTHF having p-aminomethylphenoxy groups (compound no. 16)

A mixture of 20 g of compound no. 31 ($\overline{MW}$=1450), 75 ml of THF, 50 ml of liquid ammonia and 5 g of Raney cobalt is heated with thorough mixing in a 300 l autoclave at a hydrogen pressure of 50 bar for 5 hours at 100° C. Thereafter, the mixture is cooled, the pressure is let down, filtration is carried out and the low boilers are stripped off under reduced pressure. 18.3 g of compound no. 16 where n is 13 are obtained as a viscous, yellow oil.

NMR (CDCl$_3$): $\delta$=1.4–2.0 (m); 3.2–3.6 (m); 3.9 (m); 4.0 (t); 6.9 and 7.2 (d, d)

$\overline{MW}$ (determined by osmometry in chloroform): 1450

EXAMPLE 21

Preparation of PTHF having p-formylaminophenoxy groups (compound no. 23)

A mixture of 84 g of compound no. 3, 13.5 g of formamide and 200 ml of N-methylpyrrolidone is heated at 120° C. until no further ammonia escapes (about 5 hours). Excess formamide and solvent are then distilled off under reduced pressure. 86 g of compound no. 23 where n is 9 are obtained.

NMR (CDCl$_3$): $\delta$=1.4–1.8 (m); 3.2–3.6 (m); 4.0 (t); 6.6 and 7.6 (d, d); 8.4 (s); 9.0 (broad s)

$\overline{MW}$ (determined by osmometry in chloroform): 902

EXAMPLE 22

Preparation of PTHF having p-isocyanatophenoxy groups (compound no. 40)

A solution of 84 g of compound no. 3 ($\overline{MW}=650$) in 200 ml of o-dichlorobenzene is initially taken, hydrogen chloride is passed in at 0° C. and the resulting suspension of the dihydrochloride is reacted at 120°-130° C. with about 20 g of phosgene. After a reaction time of 5 hours, the virtually clear reaction mixture is filtered, the solvent is distilled off and the residue is dried under reduced pressure from an oil pump. 85 g of compound no. 40 where n is 9 are obtained.

NMR (CDCl$_3$): δ=1.4–1.8 (m); 3.2–3.6 (m); 3.9 (t); 6.8 and 7.0 (d, d)

$\overline{MW}$ (determined by osmometry in chloroform): 895

EXAMPLE 23

Preparation of PTHF having p-nonylphenoxy groups (compound no. 42)

26.4 g of p-nonylphenol and 6.5 g of sodium methylate in 20 ml of methanol are reacted with 507 g of a 48% strength solution of PTHF 4500 dimesylate in toluene, similarly to Example 3. Working up in the same manner gives 246 g of compound no. 42 where n is 61 as a yellowish product which solidifies into a wax-like material.

NMR (CDCl$_3$): δ=0.9 (m); 1.2–2.1 (m); 2.5 (t); 3.3–3.6 (m); 3.9 (t); 6.7 and 7.0 (d, d)

$\overline{MW}$ (NMR): 4900

We claim:

1. A polytetrahydrofuran derivative of the formula

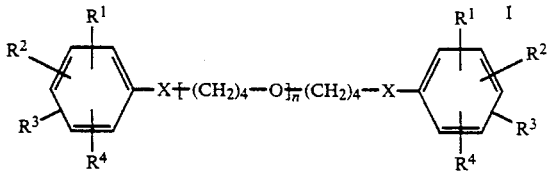

where n is from 2 to 70, X is the bridge member —O—, $R^1$ is OCH—NH—, HO—, OHC—, NC—, HOCH$_2$—, ClH$_2$C—, FH$_2$C—, Cl$_3$C—, F$_3$C—, HO$_3$S—, ClOC—, OCN— or NCO— radical or one of the radicals R$^5$O—CO—, R$^5$CO—, R$^5$O—, R$^5$CO—NH—, R$^5$OOC—NH— or R$^5$OOC—O—, in which R$^5$ is alkyl of 1 to 10 carbon atoms, R$^2$ and R$^3$ are each hydrogen, alkyl of 1 to 10 carbon atoms or an OHC—NH—, HO—, OHC—, NC— or HOCH$_2$-radical, and R$^4$ is hydrogen, alkyl of 1 to 4 carbon atoms or an HO— radical.

* * * * *

UNITED STATES PATENT AND TRADEMARK OFFICE
CERTIFICATE OF CORRECTION

PATENT NO. : 5,130,454

DATED : July 14, 1992

INVENTOR(S) : Hickmann et al.

It is certified that error appears in the above-identified patent and that said Letters Patent is hereby corrected as shown below:

ON THE TITLE PAGE

IN THE ABSTRACT:

Next to the last line: after $R^1$, delete "and", and substitute --to--.

Signed and Sealed this

Tenth Day of August, 1993

Attest:

MICHAEL K. KIRK

Attesting Officer    Acting Commissioner of Patents and Trademarks